United States Patent
Ochiai (10) Patent No.: US 11,102,967 B2
(45) Date of Patent: Aug. 31, 2021

(54) SOUND GENERATING MECHANISM FOR A SPINNING REEL

(71) Applicant: Shimano Inc., Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 108 days.

(21) Appl. No.: 16/539,826

(22) Filed: Aug. 13, 2019

(65) Prior Publication Data

US 2020/0093109 A1 Mar. 26, 2020

(30) Foreign Application Priority Data

Sep. 26, 2018 (JP) .............................. JP2018-180502

(51) Int. Cl.
*A01K 89/01* (2006.01)

(52) U.S. Cl.
CPC ...... *A01K 89/0122* (2015.05); *A01K 89/0111* (2013.01); *A01K 89/0114* (2013.01)

(58) Field of Classification Search
CPC ............ A01K 89/0111; A01K 89/0122; A01K 89/0123; A01K 89/0124; A01K 89/051
See application file for complete search history.

(56) References Cited

U.S. PATENT DOCUMENTS

| 4,549,702 | A | * | 10/1985 | Councilman | ........ | A01K 89/027 242/246 |
| 5,485,969 | A | * | 1/1996 | Yamaguchi | ........ | A01K 89/0117 242/247 |
| 2004/0178290 | A1 | * | 9/2004 | Sugawara | .............. | A01K 89/01 242/307 |
| 2008/0149750 | A1 | * | 6/2008 | Kitajima | ................ | A01K 89/01 242/224 |
| 2008/0290202 | A1 | * | 11/2008 | Ochiai | .............. | A01K 89/0111 242/246 |
| 2014/0291430 | A1 | * | 10/2014 | Takamatsu | ........... | A01K 89/015 242/283 |

FOREIGN PATENT DOCUMENTS

JP  2006-217849 A  8/2006

* cited by examiner

*Primary Examiner* — Emmanuel M Marcelo
(74) *Attorney, Agent, or Firm* — Global IP Counselors, LLP (57) ABSTRACT

A sound generating mechanism for a spinning reel that generates sound by rotation of a spool relative to a spool shaft includes a first member, a second member, a pin member, a coil spring and a metal holding member. The first member is integrally rotatable with the spool, and has a plurality of concavo-convex portions arranged at intervals in a direction of rotation of the spool. The second member is rotationally fixed with respect to the spool shaft. The pin member is disposed to be capable of contacting the concavo-convex portions. The coil spring is configured to bias the pin member toward the concavo-convex portions. The metal holding member is attached to the second member and holding the coil spring.

7 Claims, 6 Drawing Sheets

SOUND GENERATING MECHANISM FOR A SPINNING REEL

CROSS-REFERENCE TO RELATED APPLICATIONS

This application claims priority to Japanese Patent Application No. 2018-180502, filed on Sep. 26, 2018. The entire disclosure of Japanese Patent Application No. 2018-180502 is hereby incorporated herein by reference.

BACKGROUND

Field of the Invention

The present invention relates to a sound generating mechanism for a spinning reel, and in particular to a sound generating mechanism for a spinning reel that generates sound by rotation of a spool relative to a spool shaft. In addition, the present invention relates to a spinning reel having a sound generating mechanism for a spinning reel.

Background Art

In a conventional sound generating mechanism for a spinning reel, for example, a drag sound generating mechanism includes a holding member that holds a coil spring and is formed from a synthetic resin (refer to Japanese Published Unexamined Application No. 2006-217849). The holding member includes an attachment portion, a tubular portion, and a locking projection. The tubular portion is integrally formed with the attachment portion. The coil spring is disposed inside the tubular portion. The locking projection is disposed inside the tubular portion.

In this type of drag sound generating mechanism, in order to dispose the locking projection inside the tubular portion, it is necessary to separately form the locking projection and the attachment portion. In this case, the coil spring is first disposed in the tubular portion. The locking projection is then inserted through the proximal end portion of the coil spring. In this state, the locking projection is attached to the attachment portion. As a result, the holding member and the coil spring are assembled as a single unit. Finally, the holding member and the coil spring are attached to a member that rotates relative to a cover member (concavo-convex portion), for example, to a first disk.

SUMMARY

In a conventional drag sound generating mechanism, since the holding member is formed from a synthetic resin, there is the risk that the holding member will deteriorate due to the heat generated by the drag mechanism. In addition, in the conventional drag sound generating mechanism, in order to assemble the holding member and the coil spring as a single unit, the locking projection, that is separate from the attachment portion, must be locked to the coil spring and attached to the attachment portion. As a result, many steps are required to assemble the holding member and the coil spring as a single unit. Additionally, since the holding member is a small member, the locking projection could not be easily locked to the coil spring or attached to the attachment portion.

The present invention was made in light of the problem described above, and an object of the present invention is to provide a sound generating mechanism for a spinning reel and a spinning reel that can prevent the deterioration of the holding member. Another object of the present invention is to provide a sound generating mechanism of a spinning reel and a spinning reel that can improve the assembly of the holding member and the coil spring.

A sound generating mechanism of a spinning reel according to one aspect of the present invention is a mechanism that generates sound by rotation of a spool relative to a spool shaft.

The sound generating mechanism for a spinning reel comprises a first member, a second member, a pin member, a coil spring, and a holding member made of metal. The first member is configured to be integrally rotatable with a spool. The first member has a plurality of concavo-convex portions that are arranged at intervals in a direction of rotation of the spool.

The second member is configured so as to be rotationally fixed with respect to the spool shaft. The pin member is disposed so as to be capable of contacting the concavo-convex portions described above. The coil spring biases the pin member toward the concavo-convex portions. The metal holding member is attached to the second member and holds the coil spring.

In the sound generating mechanism for a spinning reel of the present invention, because the holding member is made of metal, it is possible to prevent the deterioration of the holding member even if other components generate heat in the vicinity of the sound generating mechanism of a spinning reel.

In the sound generating mechanism of a spinning reel according to another aspect of the present invention, the holding member preferably includes an attachment portion that is attached to the second member, a holding portion that holds the coil spring, and a locking portion that locks the coil spring. Here, the attachment portion, the holding portion, and the locking portion are integrally formed.

In this embodiment, it is not necessary to attach the locking portion to the attachment portion in the holding member. For this reason, by allowing the coil spring to be locked by the locking portion of the holding member and held by the holding portion of the holding member, it is possible to easily assemble the holding member and the coil spring as a single unit. In this manner, by the sound generating mechanism for a spinning reel of the present invention, it is possible to improve the assembly of the holding member and the coil spring.

In the sound generating mechanism for a spinning reel according to another aspect of the present invention, the coil spring is preferably disposed in a space between the second member and the holding portion. Here, the locking portion locks the coil spring from outside of this space.

In this embodiment, since the coil spring is locked from outside of the space between the second member and the holding portion while being disposed in the space, the coil spring can be easily attached to the holding member.

In the sound generating mechanism of a spinning reel according to another aspect of the present invention, the locking portion is integrally formed with the holding portion so as to be capable of facing the concavo-convex portions.

In this embodiment, the coil spring can reliably bias the pin member toward the concavo-convex portions when locked to the locking portion.

In the sound generating mechanism of a spinning reel according to another aspect of the present invention, the holding portion is preferably integrally formed with the attachment portion between the locking portion and the concavo-convex portions.

In this embodiment, the coil spring can be reliably held by the holding portion between the locking portion and the concavo-convex portions.

In the sound generating mechanism of a spinning reel according to another aspect of the present invention, the holding member is preferably molded by press-molding.

In this embodiment, each configuration of the holding member can be easily formed. In addition, the holding member can be easily formed, even if the holding member has a complex shape.

A spinning reel according to another aspect of the present invention comprises a reel body, a spool shaft disposed in the reel body, a spool that is disposed so as to be rotatable relative to the spool shaft, and a sound generating mechanism with any one of the above-described configurations that generates sound by rotation of the spool shaft relative to the spool.

Since the present spinning reel has the sound generating mechanism described above, the same effect as described above can be obtained.

According to the present invention, it is possible to prevent the deterioration of a holding member of a sound generating mechanism for a spinning reel and of the spinning reel. In addition, by the present invention, it is possible to improve the assembly of the holding member and the coil spring in the sound generating mechanism for a spinning reel and of the spinning reel.

DETAILED DESCRIPTION OF THE EMBODIMENT

Figure 2:
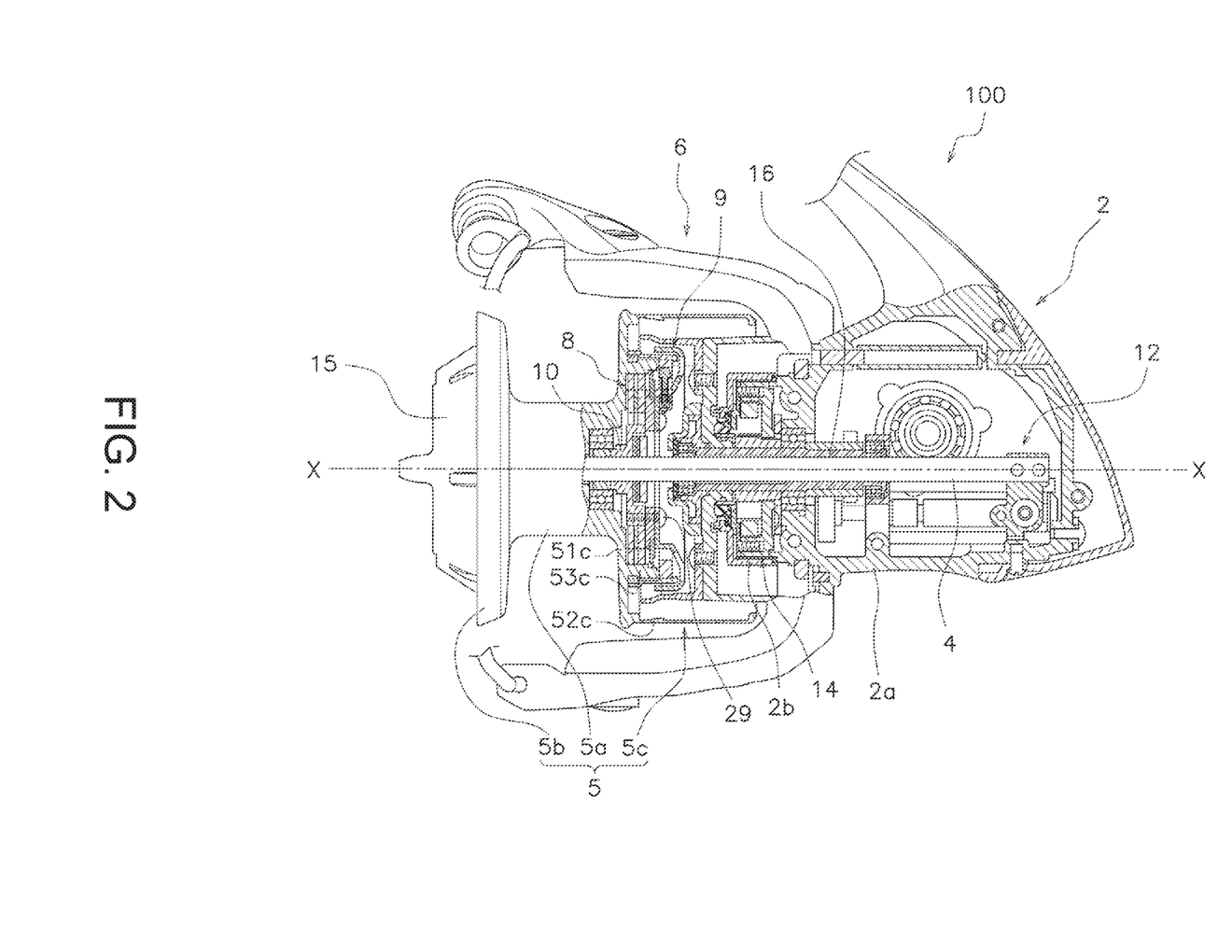
FIG. 2 is a cross-sectional view of the spinning reel.

A spinning reel 100 employing one embodiment of the present invention comprises a reel body 2, a handle 3, a spool shaft 4 (refer to FIG. 2), a spool 5, a rotor 6, a drag mechanism 8 (refer to FIG. 2), and a sound generating mechanism 9 (sound generator) (refer to FIG. 2).

The axis of the spool 4 is referred to as the X axis. It should be noted that the direction in which the X axis extends as well as the direction along the X axis is referred to as the axial direction. The direction around the X axis, centered at the X axis, is referred to as the direction of rotation (circumferential direction). The direction away from the X axis, centered at the axis X, is referred to as the radial direction. In addition, in the axial direction, the direction in which a fishing line is cast (unreeled) is referred to as "front," and the direction opposite to the "front" is referred to as the "back."

As illustrated in FIG. 2, the reel body 2 has a reel body portion 2a and a cylindrical portion 2b. The reel body portion 2a has an internal space. An oscillating mechanism (oscillator) 12 for moving the spool 5 in the longitudinal direction is disposed in the internal space.

In addition, a portion of a rotor drive mechanism (not shown) for driving the rotor 6 is disposed in the internal space. The cylindrical portion 2b is disposed in the front portion of the reel body portion 2a. In the cylindrical portion 2b, a one-way clutch 14 is disposed inside the cylindrical portion 2b. The oscillating mechanism 12 and the rotor drive mechanism have essentially the same configurations as conventional configurations, so that the descriptions thereof are omitted.

Figure 1:
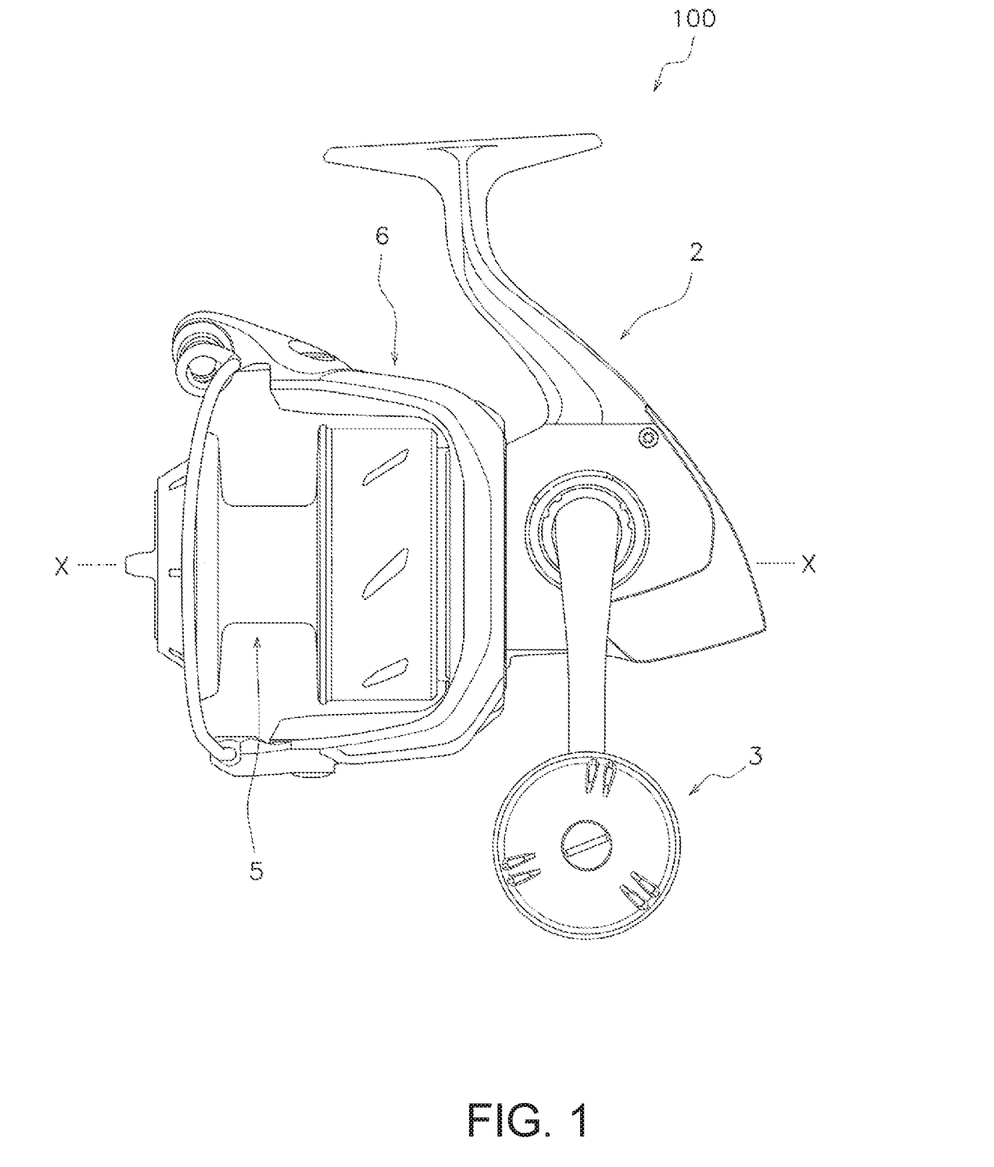
FIG. 1 is a side view of a spinning reel employing one embodiment of the present invention.

The handle 3 is rotatably supported by the reel body 2. In the present embodiment, an example of a case in which the handle 3 is disposed on the left side of the reel body 2 is shown, but the handle 3 may be disposed on the right side of the reel body 2.

The spool shaft 4 is supported by the reel body 2. The spool shaft 4 extends in the axial direction. The spool shaft 4 is moved in reciprocating fashion by the oscillating mechanism 12 in the longitudinal direction with respect to the reel body 2. The spool 5 is connected to the spool shaft 4 via the drag mechanism 8.

The spool 5 is configured so as to be integrally movable with the spool shaft 4 in the axial direction. For example, the spool 5 is mounted on the spool shaft 4 via a drag operating unit (drag operator) 15 that is screwed onto the distal end portion of the spool shaft 4.

As a result, when the spool shaft 4 moves in reciprocating fashion in the longitudinal direction with respect to the reel body 2, as described above, the spool 5 also moves in reciprocating fashion in the longitudinal direction with respect to the reel body 2. FIG. 2 shows an example in which the spool 5 has moved to the rearmost position with respect to the reel body 2.

In addition, the spool 5 is configured to be rotatable relative to the spool shaft 4. For example, the spool 5 is connected to be rotatable relative to the spool shaft 4 via the drag mechanism 8.

The spool 5 has a bobbin trunk 5a, a flange portion 5b, and a skirt portion 5c. A fishing line is wound around the outer periphery of the bobbin trunk 5a. The flange portion 5b is integrally formed at the front portion of the bobbin trunk 5a.

The skirt portion 5c is integrally formed at the rear portion of the bobbin trunk 5a. The skirt portion 5c is disposed spaced apart from the flange portion 5b in the axial direction. For example, the skirt portion 5c includes a wall portion 51c and a tubular portion 52c.

The wall portion 51c is integrally formed on the bobbin trunk 5a. The wall portion 51c is formed with an essentially annular shape. The wall portion 51c extends radially outward from the rear portion of the bobbin trunk 5a. A drag housing portion 53c is disposed on the wall portion 51c.

For example, the drag housing portion 53c is integrally formed with the wall portion 51c radially inward of the tubular portion 52c. The drag housing portion 53c is formed with an essentially cylindrical shape. The drag housing portion 53c extends from the wall portion 51c in the axial direction (rearward). The drag mechanism 8 is housed on the radially inward side of the drag housing portion 53c. A plurality of first engagement recesses 53d (refer to FIG. 3) are disposed on the inner circumferential surface of the drag housing portion 53c. The plurality of first engagement recesses 53d are disposed at intervals in the circumferential direction.

The tubular portion 52c is integrally formed on the outer peripheral portion of the wall portion 51c. The tubular portion 52c extends from the outer peripheral portion of the wall portion 51c in the axial direction (rearward). The outer diameter of the tubular portion 52c is greater than the outer diameter of the bobbin trunk 5a. The sound generating mechanism 9 is disposed on the radially inward side of the tubular portion 52c.

The rotor 6 is for winding the fishing line around the spool 5. The rotor 6 is configured so as to be rotatable with respect to the reel body 2. The rotor 6 is coupled to the pinion gear 16 so as to be integrally rotatable. Rotation of the handle 3 is transmitted to a pinion gear 16 via a rotor drive mechanism. The pinion gear 16 is formed in a tubular shape. The spool shaft 4 is inserted through the inner peripheral portion of the pinion gear 16.

Figure 3:
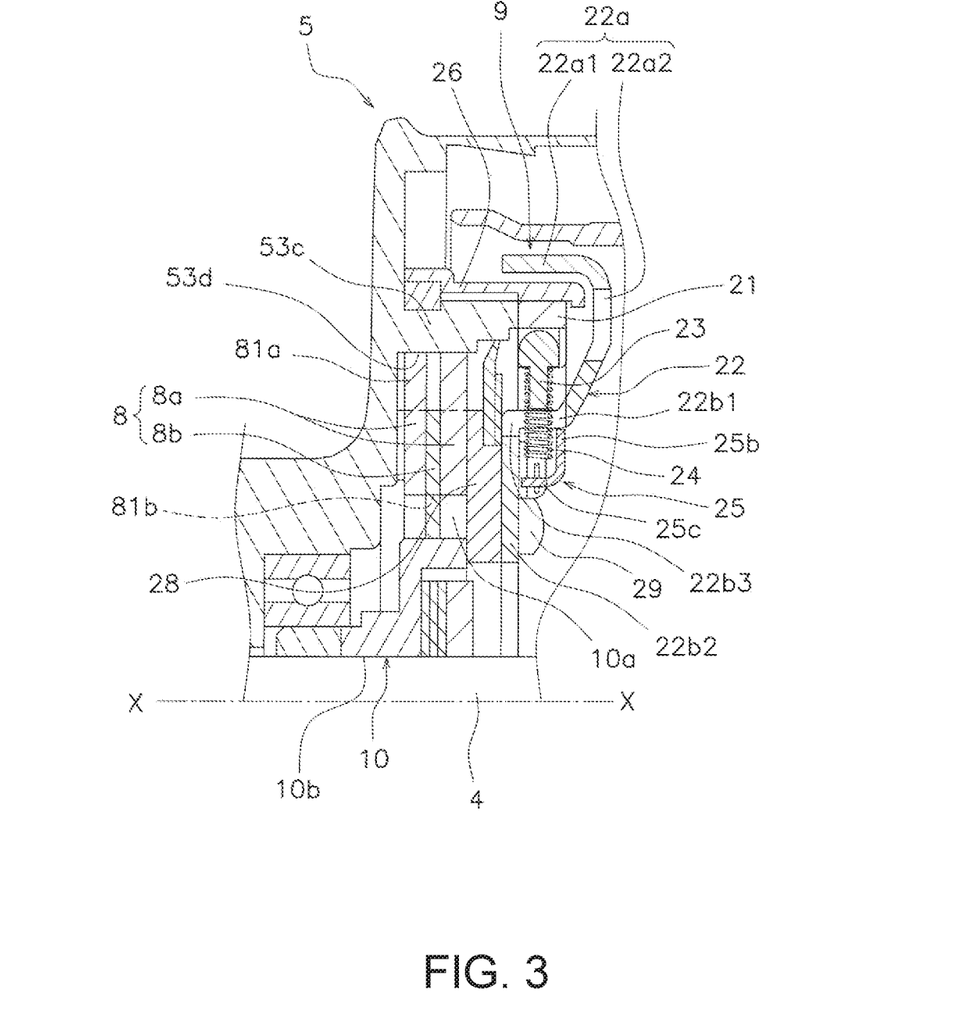
FIG. 3 is a partially enlarged cross-sectional view of the spinning reel.

As shown in FIG. 3, the drag mechanism 8 applies a drag force to the spool 5 by adjusting the drag operating unit 15 (refer to FIG. 2). The drag mechanism 8 is disposed between the spool 5 and the spool shaft 4.

The drag mechanism 8 has a plurality of first friction disks 8a, and least one (for example, one) second friction disk 8b. The first friction disks 8a and the second friction disk 8b are alternately disposed in the axial direction. The first friction disks 8a and the second friction disk 8b contact each other in the axial direction and generate a friction force.

The first friction disks 8a are mounted on the spool 5 so as to be integrally rotatable. A plurality of first engagement protrusions 81a are disposed on the outer peripheral portion of the first friction disk 8a. Each of the plurality of first engagement protrusions 81a is arranged at an interval in the circumferential direction. Each of the plurality of first engagement protrusions 81a engages the first engagement recess 53d of the drag housing portion 53c. In this manner, the first friction disks 8a are configured so as to be integrally rotatable with respect to the spool 5.

The second friction disk 8b is mounted on the spool shaft 4 to be integrally rotatable. For example, the second friction disk 8b is mounted on the spool shaft 4 to be integrally rotatable via a connecting member (connector) 10. A plurality of second engagement recesses 81b are disposed on the inner peripheral portion of the second friction disk 8b. The plurality of second engagement recesses 81b are each disposed at intervals in the circumferential direction.

As shown in FIG. 3, the connecting member 10 is non-rotatably mounted on the spool shaft 4. The connecting member 10 has a plurality of second engagement protrusions 10a and a hole portion 10b. The plurality of second engagement protrusions 10a are disposed on the outer peripheral portion of the connecting member 10. Each of the plurality of second engagement protrusions 10a is arranged at an interval in the circumferential direction. The second engagement recess 81b of the second friction disk 8b engages each of the plurality of second engagement protrusions 10a. In this manner, the second friction disk 8b is non-rotatably mounted with respect to the connecting member 10.

The hole portion 10b is disposed in the central portion of the connecting member 10. The hole portion 10b is formed with a non-circular shape. A portion of the spool shaft 4 whose outer circumferential surface is formed with a non-circular shape is inserted into the hole portion 10b. In this manner, the connecting member 10 is non-rotatably mounted on the spool shaft 4. In this state, the connecting member 10 is positioned in the axial direction with respect to the spool shaft 4.

The sound generating mechanism 9 generates sound by the rotation of the spool 5 relative to the spool shaft 4.

Figure 4:
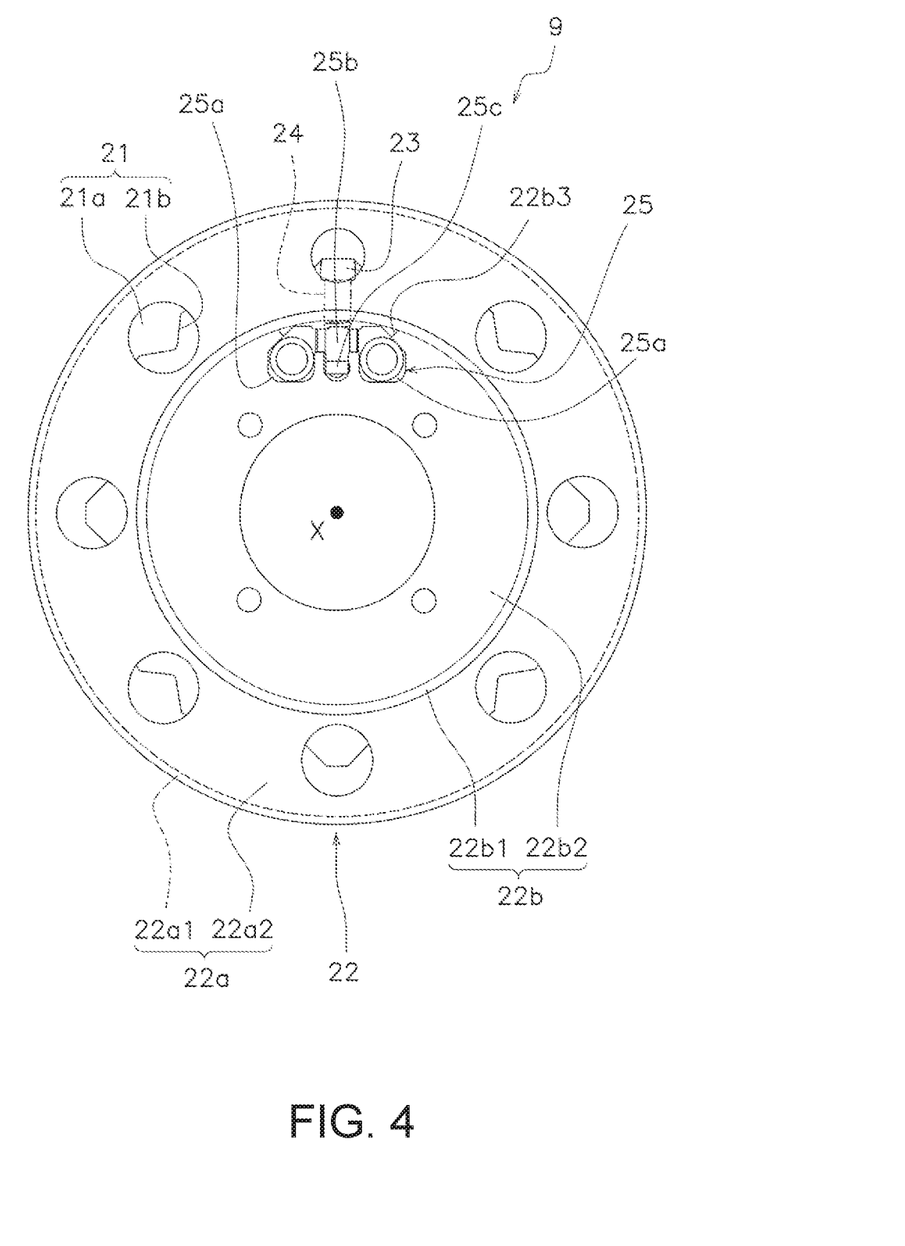
FIG. 4 is a side view of the sound generating mechanism as seen from the reel body side.

As shown in FIGS. 3 and 4, the sound generating mechanism 9 comprises a first member 21, a second member 22, a pin member 23, a coil spring 24, and a holding member (holder) 25 made of metal.

The first member 21 is configured to integrally rotate with the spool 5. This can be understood as the first member 21 being configured to be non-rotatable with respect to the spool 5. For example, the first member 21 is attached to the spool 5 so as to rotate integrally via an attachment member 26 (refer to FIG. 2). The attachment member 26 is formed with an essentially cylindrical shape. The attachment member 26 is attached to the spool 5 so as to be integrally rotatable. The attachment member 26 is fixed to the outer circumferential surface of the drag housing portion 53c.

Figure 5:
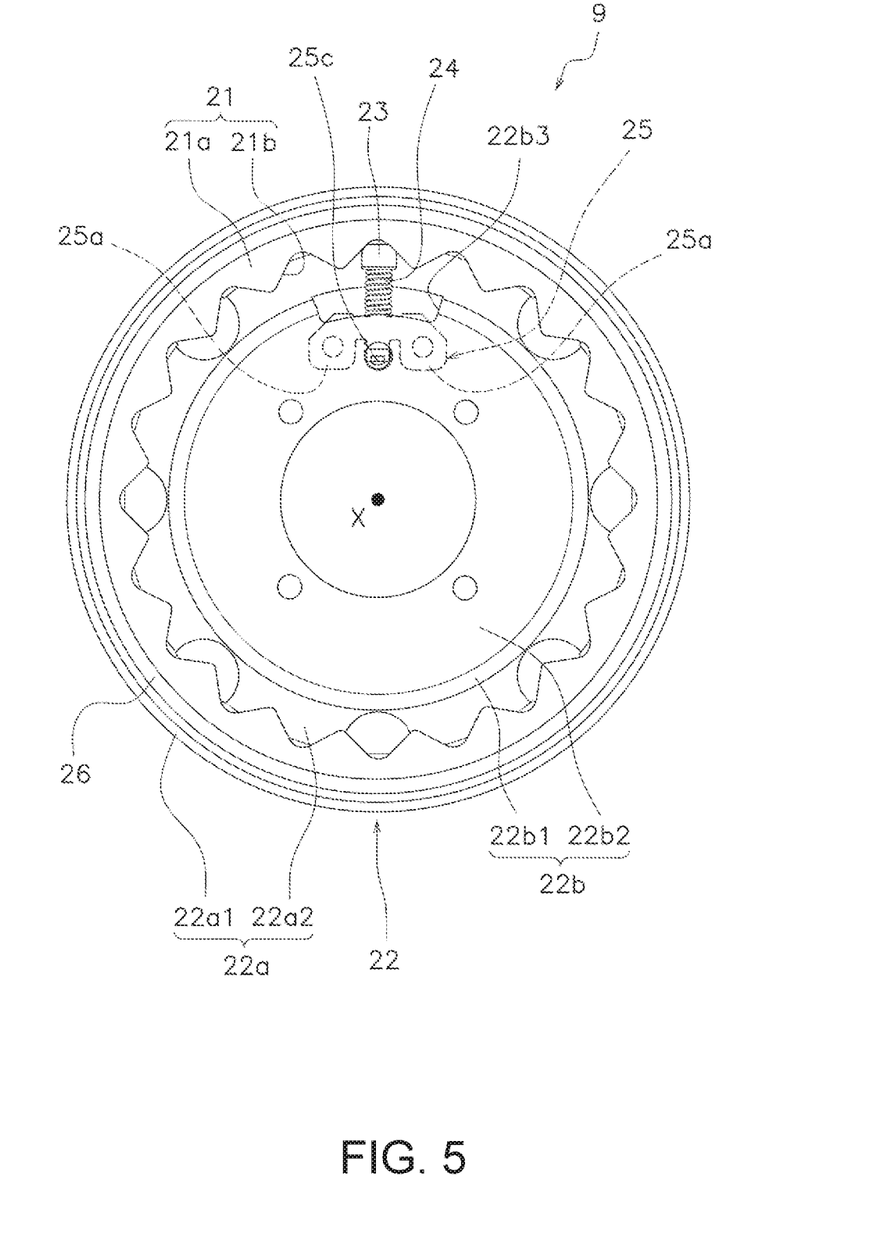
FIG. 5 is a side view of the sound generating mechanism as seen from the spool side.

As shown in FIG. 5, the first member 21 has a body portion 21a and a plurality of concavo-convex portions 21b. The body portion 21a is formed with an essentially annular shape. The body portion 21a is attached to the inner circumferential surface of the attachment member 26. The plurality of concavo-convex portions 21b are formed on the inner peripheral portion of the body portion 21a. Each of the plurality of concavo-convex portions 21b is disposed at an interval in the rotational direction of the spool 5.

The second member 22 is configured to be non-rotatable with respect to the spool shaft 4. The second member 22 is non-rotatably attached to the connecting member 10. For example, the second member 22 is fixed to the connecting member 10 (refer to FIG. 2) by a fixing device (or means), such as a screw member 29.

As shown in FIGS. 3-5, the second member 22 has a cover portion 22a and an attached portion 22b. The cover portion 22a covers the first member 21. In particular, the cover portion 22a covers the first member 21 and the attachment member 26 (refer to FIG. 3).

The cover portion 22a has a first tubular portion 22a1 and a first annular wall portion 22a2. The first tubular portion 22a1 is disposed radially outward of the first member 21 and the attachment member 26. The first annular wall portion 22a2 is integrally formed on the inner circumferential surface of the first tubular portion 22a1. The first annular wall portion 22a2 extends radially inward from the inner circumferential surface of the first tubular portion 22a1. The first annular wall portion 22a2 is disposed on a side of the first member 21 in the axial direction.

The holding member 25 is attached to the attached portion 22b. The attached portion 22b is integrally formed on the inner peripheral portion of the cover portion 22a. The attached portion 22b is disposed radially inward of the first member 21.

The attached portion 22b has a second tubular portion 22b1 and a second annular wall portion 22b2. The second annular wall portion 22b1 is integrally formed on the inner circumferential surface of the first annular wall portion 22a2. The second tubular portion 22b1 extends in the axial direction (forward) from the inner peripheral portion of the first annular wall portion 22a2.

The second tubular portion 22b1 is disposed radially inward of the first member 21. The second tubular portion 22b1 is disposed spaced apart from the first member 21 in the radial direction. A window portion 22b3 is formed in the second tubular portion 22b1. The window portion 22b3 penetrates the second tubular portion 22b1 in the radial direction. The pin member 23 and the coil spring 24 are inserted into the window portion 22b3.

The second annular wall portion 22b2 is integrally formed with the second tubular portion 22b1. The second annular wall portion 22b2 extends radially inward from the second tubular portion 22b1. The second annular wall portion 22b2 is fixed to the connecting member 10 by a fixing device (or means), such as the screw member 29 (refer to FIG. 2). In particular, the second annular wall portion 22b2 is fixed to the connecting member 10 by the screw member 29 via a support member 28 that supports a seal member.

Figure 6:
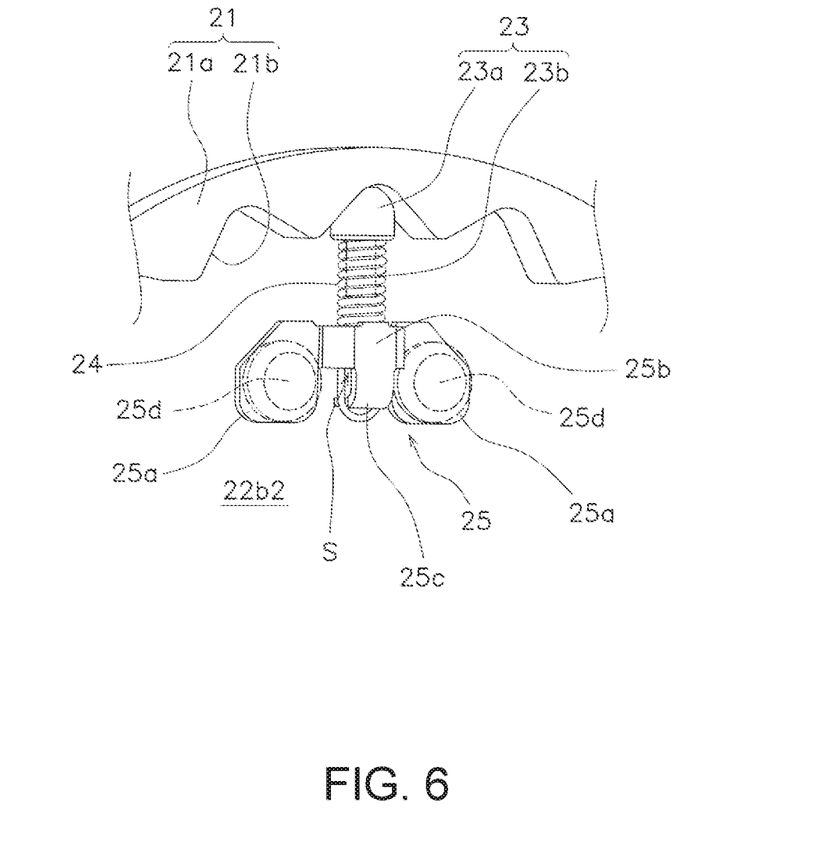
FIG. 6 is a partially enlarged perspective view of the sound generating mechanism.

As shown in FIGS. 4 and 5, the pin member 23 is disposed so as to be capable of contacting each of the plurality of concavo-convex portions 21b. As shown in FIG. 6, the pin member 23 has a head portion 23a and a shaft portion 23b. The head portion 23a contacts each of the plurality of concavo-convex portions 21b. The shaft portion 23b is disposed on the head portion 23a. The shaft portion 23b is disposed on the inner peripheral portion of the coil spring 24.

As shown in FIGS. 3-5, the coil spring 24 biases the pin member 23 toward the concavo-convex portions 21b. As shown in FIGS. 3 and 6, the coil spring 24 is disposed in a space S between the second member 22 and a spring holding portion (spring holder) 25b (described further below) of the holding member 25 in the axial direction. In particular, the coil spring 24 is disposed in the space S between the second annular wall portion 22b2 and the spring holding portion 25b in the axial direction.

As shown in FIGS. 3 to 6, the coil spring 24 is disposed between a spring locking portion (spring lock) 25c (described further below) of the holding member 25 and the first tubular portion 22a1 of the second member 22 in the radial direction. In particular, the coil spring 24 is disposed between the concavo-convex portions 21b and the locking portion of the holding member 25 in the radial direction.

More specifically, as shown in FIG. 6, the coil spring 24 is disposed between the head portion 23a of the pin member 23 and the locking portion of the holding member 25. One end of the coil spring 24 abuts the head portion 23a of the pin member 23 and the other end of the coil spring 24 is locked to the spring locking portion 25c of the holding member 25.

As shown in FIGS. 4 to 6, the metal holding member 25 is attached to the second member 22 and holds the coil spring 24. The holding member 25 is formed by press-molding. The holding member 25 has a pair of attachment portions 25a, a spring holding portion 25b (one example of a holding portion), and a spring locking portion 25c (one example of a locking portion). The pair of attachment portions 25a, the spring holding portion 25b, and the spring locking portion 25c are integrally formed.

The pair of attachment portions 25a is attached to the second member 22. For example, the two attachment portions 25a are disposed spaced apart from each other. Each of the pair of attachment portions 25a is fixed to the second annular wall portion 22b2 by a fixing means, such as a screw member 25d.

The spring holding portion 25b is for holding the coil spring 24. The spring holding portion 25b is formed integrally with the pair of attachment portions 25a. The spring holding portion 25b is formed integrally with the pair of attachment portions 25a between the spring locking portion 25c and the concavo-convex portions 21b.

The spring holding portion 25b connects the pair of attachment portions 25a. For example, the spring holding portion 25b connects the pair of attachment portions 25a while curving from one of the attachment portions 25a to the other attachment portion 25a. As a result, the space S (refer to FIG. 6) for disposing the coil spring 24 is disposed between the spring holding portion 25b and the second annular wall portion 22b2 when the pair of attachment portions 25a are attached to the second member 22.

The spring locking portion 25c locks the coil spring 24. For example, as shown in FIG. 6, the spring locking portion 25c locks the other end of the coil spring 24 outside of the above-described space S. The spring locking portion 25c is disposed on the spring holding portion 25b. For example, the spring locking portion 25c is integrally formed with the spring holding portion 25b so as to be capable of opposing the concavo-convex portions 21b. In particular, the spring locking portion 25c extends radially inward from the spring holding portion 25b and is bent toward the second member 22, for example, the second annular wall portion 22b2, when the holding member 25 is attached to the second member 22.

In the sound generating mechanism 9 having the configuration described above, when the spool 5 is rotated relative to the spool shaft 4 via the drag mechanism 8, the pin member 23 that is attached to the coil spring 24 repeatedly comes into contact with the concavo-convex portions 21b. The sound generating mechanism 9 generates sound by this contact.

In such a sound generating mechanism 9, since the holding member 25 is made of metal, it is possible to prevent the deterioration of the holding member 25 even if the drag mechanism 8 generates heat in the vicinity of the sound generating mechanism 9. In addition, since the attachment portions 25a, the spring holding portion 25b, and the spring locking portion 25c are integrally formed, it is not necessary to attach the spring locking portion 25c to the attachment portions 25a in the holding member 25. For this reason, by allowing the coil spring 24 to be locked by the spring locking portion 25c of the holding member 25 and held by the spring holding portion 25b of the holding member 25, it is possible to easily assemble the holding member 25 and the coil spring 24 as a single unit. In this manner, by the sound generating mechanism 9, it is possible to improve the assembly of the holding member 25 and the coil spring 24.

Other Embodiments

In the embodiment described above, an example is presented in which the body portion 21a of the first member 21 is attached to the attachment member 26. Alternatively, the body portion 21a of the first member 21 may be integrally formed with the attachment member 26. In this embodiment, the first member 21 has the body portion 21a, the plurality of concavo-convex portions 21b, and an attachment portion 26 for the first member. The attachment portion 26 for the first member is fixed to the spool 5, for example, to the drag housing portion 53c, in the same manner as in the above-described embodiment.

In the embodiment described above, an example was presented in which the second member 22 is mounted via the support member 28 on the connecting member 10, which is non-rotatably connected to the spool shaft 4. Alternatively, the second member 22 may be directly mounted on the connecting member 10, which is non-rotatably connected to the spool shaft 4.

In the embodiment described above, an example is presented in which the second member 22 is mounted via the support member 28 on the connecting member 10, which is non-rotatably connected to the spool shaft 4. Alternatively, the second member 22 may be non-rotatably mounted directly to the spool shaft 4.

In the embodiment described above, an example is presented in which the spring locking portion 25c is integrally formed with the spring holding portion 25b so as to be capable of opposing the concavo-convex portions 21b. Alternatively, as shown in FIG. 7, the spring locking portion 25c can be integrally formed with the attachment portions 25a so as to be capable of opposing the concavo-convex portions 21b.

What is claimed is:

1. A sound generating mechanism for a spinning reel that generates sound by rotation of a spool relative to a spool shaft, comprising:
   a first member configured to be integrally rotatable with the spool, having a plurality of concavo-convex portions arranged at intervals in a direction of rotation of the spool;
   a second member configured to be rotationally fixed with respect to the spool shaft;
   a pin member disposed to be configured and arranged to contact the concavo-convex portions;
   a coil spring configured to bias the pin member toward the concavo-convex portions; and
   a metal holding member attached to the second member and holding the coil spring, the holding member including a holding portion unitarily formed with a locking portion, such that the locking portion extends from the holding portion parallel to an axial direction of the spinning reel.

2. The sound generating mechanism of a spinning reel according to claim 1, wherein
   the holding member is formed by press-molding.

3. A spinning reel, comprising
   a reel body;
   the spool shaft disposed in the reel body;
   the spool disposed to be rotatable relative to the spool shaft; and
   the sound generating mechanism according to claim 1 and configured to generate sound by the rotation of the spool shaft relative to the spool.

4. A sound generating mechanism for a spinning reel that generates sound by rotation of a spool relative to a spool shaft, comprising:
   a first member configured to be integrally rotatable with the spool, having a plurality of concavo-convex portions arranged at intervals in a direction of rotation of the spool;
   a second member configured to be rotationally fixed with respect to the spool shaft;
   a pin member disposed to be configured and arranged to contact the concavo-convex portions;
   a coil spring configured to bias the pin member toward the concavo-convex portions; and
   a metal holding member attached to the second member and holding the coil spring,
   the holding member being a unitary molded member that includes an attachment portion attached to the second member, a holding portion holding the coil spring, and a locking portion locking the coil spring.

5. The sound generating mechanism for a spinning reel according to claim 4, wherein
   the coil spring is disposed in a space between the second member and the holding portion, and
   the locking portion is configured to lock the coil spring from outside of the space.

6. The sound generating mechanism for a spinning reel according to claim 4, wherein
   the locking portion is integrally formed with the holding portion to be configured to oppose the concavo-convex portions.

7. The sound generating mechanism for a spinning reel according to claim 4, wherein
   the holding portion is integrally formed with the attachment portion between the locking portion and the concavo-convex portions.

* * * * *